3,354,573
ICE FISHING TACKLE FOR SHELTER USE
Kjell Otto Johansson, 712 4th Ave. E.,
Alexandria, Minn. 56308
Filed Mar. 25, 1965, Ser. No. 442,672
3 Claims. (Cl. 43—21.2)

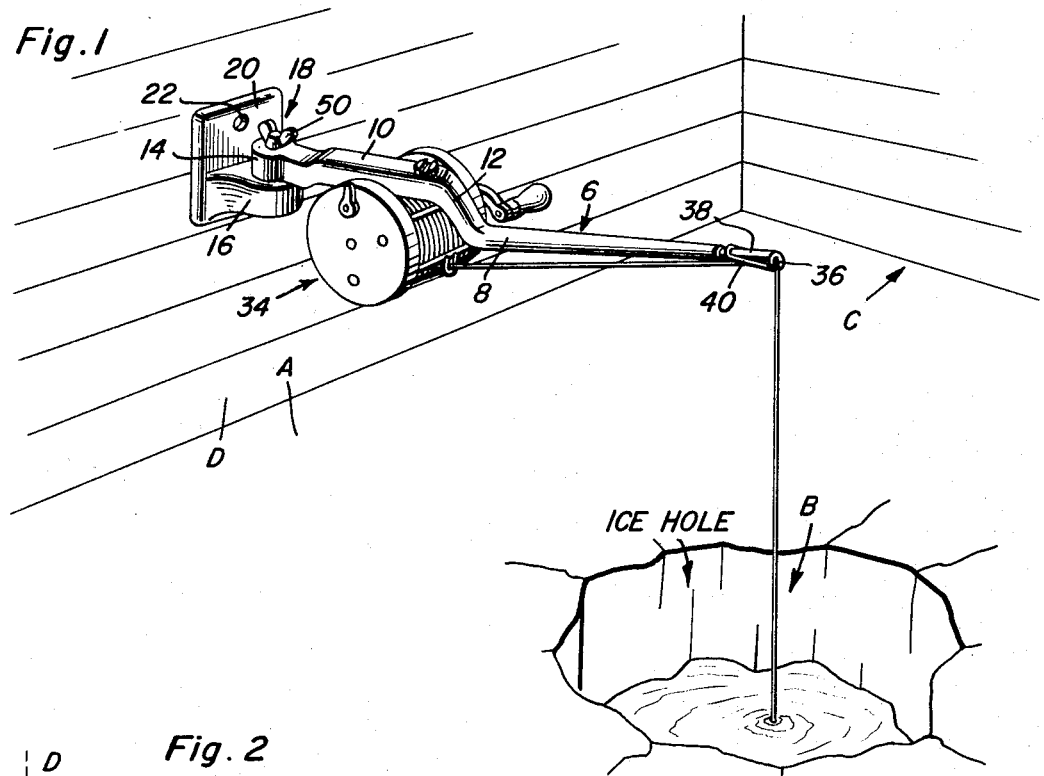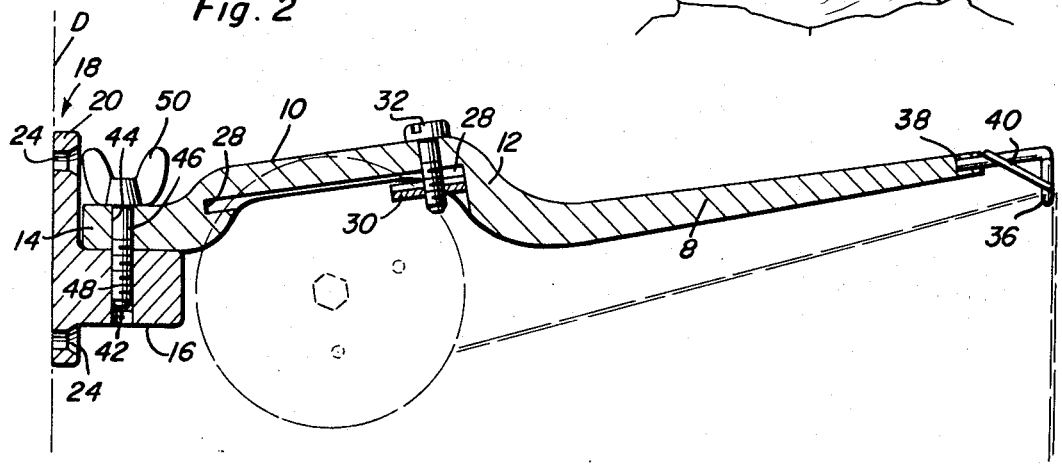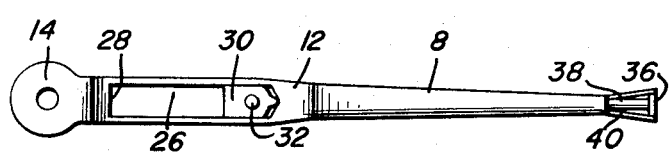

ABSTRACT OF THE DISCLOSURE

A bracket is attached to the wall of an ice fishing shanty adjacent the ice hole. A short extruded aluminum rod has a lug at an inner end superimposed upon an ear on the bracket and is detachably bolted and journaled in place. A reel is suspended beneath the reel seat of the rod. The outer end of the rod is provided with a depending fishing line guide eye.

---

This invention relates to ice fishing tackle which is expressly designed and adapted for use within the confines of the fisherman's housing area of a portable shelter, shanty or shack and has to do, more particularly, with a unique rod, reel, and bracket combination which, as experimental use has shown, effectually and well serves the fishing purposes for which it has been devised.

Tackle and gear for ice fishing is usually not too complicated. Still-fishing with bait (artificial or live) usually calls for a bait bucket or equivalent container. A chisel and a hole skimmer, a spear or gaff, a fish bag and sled are also some of the things involved in carrying out the expedition but of greater significance is the fact that a fishing shanty and simple tackle is essential if the fisherman is to be successful. Tackle varies from inexpensive tip-ups and hand lines to expensive rods and reels. The present concept pertains, as will later be more evident, to a novel rod and simple reel and an equally simple bracket which enables the fisherman to bracket one end of the rod on a wall of the shanty (shack or the like) swing the eye-equipped end above and over the hole when angling or push it against the support wall to an out-of-the-way place when it is not in use.

It follows that the concept, more explicitly, pertains to an aluminum or equivalent onepiece rod, a reel seat with attachable reel at the bracket end and an integral line guide eye at the fishing end. The bracket has a lug-like ear and the rod has a companion lug which is separably bolted atop the ear. Many and varying forms or styles of reels can be used in conjunction with the reel seat.

In carrying out the present invention the rod which is used is characterized by a relatively short rod proper the inner end of which is bent and offset and recessed to provide a reel seat and holder and which terminates in an attaching and hinging lug separably and hingedly connectible with the coacting ear on the adapter bracket. The outer end of the rod has a simple depending eye with a shank which is axially rigid with the rod.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective showing a corner portion of a shelter, shanty, or the like which the aforementioned bracket fixed on one wall and supporting the improved tackle, that is, the special purpose rod, reel thereon and line rigged for fishing by way of the ice hole;

FIGURE 2 is an enlarged sectional view in which all of the component parts of the rod and bracket are shown; and FIGURE 3 is a bottom plan view of the rod by itself, that is, detached from the bracket and also with the reel omitted.

Referring now to the views of the drawing and first to FIG. 1 the ice is denoted at A, the ice hole at B and one vertical wall of the shack or shelter C being denoted at D.

The one piece cast or molded aluminum fishing rod is denoted by the numeral 6 and compared to ordinary or regular rods it is relatively short. The rigid outwardly tapering rod proper is denoted at 8 and the reel holder or seat is denoted at 10 and is joined by way of the gradual bend or bent portion 12 to the rod. This seat terminates in an eye-like lug 14 which is appropriately constructed and designed to rest atop the top surface of a lug-like ear 16 constituting a component part of the bracket 18. This bracket embodies a vertical plate or base 20 having bolt holes 22 to accommodate attaching and retaining bolts 24 as shown in FIG. 2. This reel seat has a suitably elongated recess 26 (FIG. 3) which is provided at one end with an undercut portion 28 and has its other end suitably fashioned as at 28 to accommodate a suitable clip-type cleat 30. The latter is mounted removably and adjustably in place by a headed screw or fastener 32 carried by one end portion of the offset seat. This seat functions to accommodate the base (not detailed) of a suitable line storing and handling reel 34. The line guide eye at the outer end is denoted by the numeral 36 and has an L-shaped shank 38 which is fixed in a socket provided therefor, the shank and eye being rigidified by suitable companion bracing means 40.

The bracket 18 is also preferably made of aluminum and hence the rod and bracket are well suited to one another for cooperable association and accomplishment. The lug portion 14 of the reel seat rests on top of the ear 16 and the two parts are provided with bolt holes. The screw-threaded bolt hole 42 in the ear 16 is lined up with a coacting bolt hole 44 in the terminal lug 14 and the wall of this hole is smooth and functions as a bearing and serves to accommodate the smooth journal portion 46 of the bolt 48. The parts are assembled and separably connected as illustrated in FIG. 2. A thumb grip 50 is provided on the upper end of the bolt to facilitate assembling, hinging and joining the bracket and the rod in the highly useful manner shown in FIGS. 1 and 2.

It will be evident that the rod, reel and bracket combination provide an innovation which is ideal for the purposes under consideration. The rod and line stays put in the manner shown in FIG. 1 when fishing. After a catch has been made or whenever it is necesary or desired to move the rod out of the way, considering that the quarters are limited, this can be readily accomplished simply by loosening the hinging and assembling bolt. In fact the bolt being threaded into the bolt hole 42 permits the lug 16 to serve as a nut and facilitates clamping the lug between the nut and head of the bolt. Consequently the rod and reel function in a highly novel and useful manner which will be found to be highly desirable and useful insofar as the ice fisherman is concerned. A more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in an ice fishing shanty by an occupant fisherman who customarily resorts to the use of a rod and reel assembly, a rigid rod having an outer end provided with a depending line guide eye, having a reel seat provided with reel accommodating and retaining means at its inner end and also provided at said inner end with a terminal rod mounting and adjusting lug, said rod and its component parts being formed from one piece of aluminum, said eye being rigid and integral with said outer end, said reel seat being laterally offset and having one end provided with a detachable and adjustable reel-base gripping and retaining cleat, a bracket adapted to be fixed on a vertical support wall in said shanty, said bracket comprising an attaching plate attachable to said wall, said plate being provided with an outstanding ear, said ear having a screw-threaded bolt hole, said lug also having a bolt hole alined with said first-named bolt hole and serving as a bearing, and a headed bolt passing through said holes, screwed into said screw-threaded bolt hole and having a smooth surfaced portion providing a journal coacting with said bearing.

2. For use in an ice fishing shanty, fishing tackle comprising, in combination, a fishing rod adapted to assume and maintain a generally horizontal position, said rod being short compared to a conventional casting rod, being formed from one piece of extruded aluminum, having an outer end portion provided with a lateral depending line guide adapted to accommodate and support a slidingly mounted line, the inner end portion of said rod embodying a straight terminal lug having a bolt hole extending therethrough and constituting a bearing, that portion of the rod immediately adjacent said lug being offset and providing a downwardly opening recess constituting a reel seat, said seat provided at the respective end portions thereof with reel attaching and supporting means, a bracket adapted to be fixed on a vertical support wall in said shanty, and a bolt having a journal portion operatively alined with and mounted in said bearing, said bolt being detachably and adjustably joined to said bracket.

3. The structure defined in and according to claim 2 and wherein said bracket comprises an attaching plate attachable to said wall, said plate having an outstanding ear provided with a screw-threaded bolt hole, said terminal lug being removably and adjustably perched atop said ear, and said bolt having a screw-threaded end screwed into the screw-threaded hole provided therefor in said ear.

References Cited

UNITED STATES PATENTS

| | | | |
|---|---|---|---|
| 280,454 | 7/1883 | Crandall | 248—42 |
| 610,880 | 9/1898 | Perkins | 43—21.2 |
| 1,339,833 | 5/1920 | Saltmarsh et al. | 248—40 |
| 1,719,695 | 7/1929 | Ferguson | 43—21.2 |
| 2,523,592 | 9/1950 | Powell et al. | 43—15 |
| 2,759,288 | 8/1956 | Bratek | 43—18 |
| 2,992,505 | 7/1961 | Bowker | 43—21.2 |
| 3,034,247 | 5/1962 | Lunsman | 43—21.2 |
| 3,134,186 | 5/1964 | Krueger | 43—21.2 X |

SAMUEL KOREN, *Primary Examiner.*

WARNER H. CAMP, *Examiner.*